(12) United States Patent
Ng et al.

(10) Patent No.: US 11,474,770 B2
(45) Date of Patent: Oct. 18, 2022

(54) MULTI-VIEW NETWORK BRIDGE DEVICE

(71) Applicant: Misapplied Sciences, Inc., Redmond, WA (US)

(72) Inventors: Albert Han Ng, Pasadena, CA (US); David Steven Thompson, Redmond, WA (US); David Randall Bonds, Chatsworth, GA (US); Ayon Sen, Pasadena, CA (US)

(73) Assignee: Misapplied Sciences, Inc., Pasadena, CA (US)

( * ) Notice: Subject to any disclaimer, the term of this patent is extended or adjusted under 35 U.S.C. 154(b) by 0 days.

(21) Appl. No.: 17/212,930

(22) Filed: Mar. 25, 2021

(65) Prior Publication Data
US 2021/0303250 A1    Sep. 30, 2021

Related U.S. Application Data

(60) Provisional application No. 63/000,050, filed on Mar. 26, 2020.

(51) Int. Cl.
*G06F 3/14* (2006.01)
*G06F 3/147* (2006.01)
*H04N 21/61* (2011.01)

(52) U.S. Cl.
CPC ............ *G06F 3/1423* (2013.01); *G06F 3/147* (2013.01); *G06F 3/1454* (2013.01); *H04N 21/6106* (2013.01); *H04N 21/6156* (2013.01)

(58) Field of Classification Search
CPC ...... G06F 3/1423; G06F 3/1454; G06F 3/147; G06F 3/1446; H04N 21/6106; H04N 21/6156; G09G 2340/14; G09G 2354/00; G09G 2356/00; G09G 2370/022
See application file for complete search history.

(56) References Cited

U.S. PATENT DOCUMENTS

| | | | |
|---|---|---|---|
| 10,070,118 B2 * | 9/2018 | Baran | H04N 13/351 |
| 10,269,279 B2 | 4/2019 | Ng et al. | |
| 10,778,962 B2 * | 9/2020 | Ng | G06F 3/04847 |
| 10,999,572 B2 * | 5/2021 | Baran | B41M 3/06 |
| 2016/0212417 A1 * | 7/2016 | Ng | H04N 13/307 |
| 2018/0277032 A1 * | 9/2018 | Ng | G09G 3/025 |
| 2019/0149808 A1 * | 5/2019 | Ng | H04N 13/327 |
| | | | 348/59 |

* cited by examiner

*Primary Examiner* — Vijay Shankar
(74) *Attorney, Agent, or Firm* — Seed IP Law Group LLP

(57) ABSTRACT

A multi-view (MV) network bridge device includes an upstream interface, multiple downstream interfaces, and a controller. The controller receives, from the upstream interface, a specification of one or more viewing zones and a specification of one or more content streams. Also, the controller sends, on at least one of the downstream interfaces, at least a subset of each of the specifications received from the upstream interface. The upstream interface may be coupled to a computer that provides the specifications. Each of the downstream interfaces may be coupled to a different MV display panel. One of the downstream interfaces may be coupled to an MV display panel that is coupled to another MV display panel. One of the downstream interfaces may be coupled to an upstream interface of another MV network bridge device having a downstream interface coupled to an MV display panel.

19 Claims, 6 Drawing Sheets

202a {
Content Stream Identifier = CS1
MVP(1, 1) = Value11a
MVP(1, 2) = Value12a

...

MVP(8, 6) = Value86a

202b {
Content Stream Identifier = CS2
MVP(1, 1) = Value11b
MVP(1, 2) = Value12b

...

MVP(8, 6) = Value86b

202c {
Content Stream Identifier = CS3
MVP(1, 1) = Value11c
MVP(1, 2) = Value12c

...

MVP(8, 6) = Value86c

*FIG. 5B*

204a — 
```
Viewing Zone Identifier = VZ1
Upper, Front Left Vertex = (X1a, Y1a, Z1a)
Upper, Front Right Vertex = (X2a, Y2a, Z2a)
Upper, Rear Left Vertex = (X3a, Y3a, Z3a)
Upper, Rear Right Vertex = (X4a, Y4a, Z4a)
Lower, Front Left Vertex = (X5a, Y5a, Z5a)
Lower, Front Right Vertex = (X6a, Y6a, Z6a)
Lower, Rear Left Vertex = (X7a, Y7a, Z7a)
Lower, Rear Right Vertex = (X8a, Y8a, Z8a)
```

204b —
```
Viewing Zone Identifier = VZ2
Upper, Front Left Vertex = (X1b, Y1b, Z1b)
Upper, Front Right Vertex = (X2b, Y2b, Z2b)
Upper, Rear Left Vertex = (X3b, Y3b, Z3b)
Upper, Rear Right Vertex = (X4b, Y4b, Z4b)
Lower, Front Left Vertex = (X5b, Y5b, Z5b)
Lower, Front Right Vertex = (X6b, Y6b, Z6b)
Lower, Rear Left Vertex = (X7b, Y7b, Z7b)
Lower, Rear Right Vertex = (X8b, Y8b, Z8b)
```

204c —
```
Viewing Zone Identifier = VZ3
Upper, Front Left Vertex = (X1c, Y1c, Z1c)
Upper, Front Right Vertex = (X2c, Y2c, Z2c)
Upper, Rear Left Vertex = (X3c, Y3c, Z3c)
Upper, Rear Right Vertex = (X4c, Y4c, Z4c)
Lower, Front Left Vertex = (X5c, Y5c, Z5c)
Lower, Front Right Vertex = (X6c, Y6c, Z6c)
Lower, Rear Left Vertex = (X7c, Y7c, Z7c)
Lower, Rear Right Vertex = (X8c, Y8c, Z8c)
```

*FIG. 5C*

MULTI-VIEW NETWORK BRIDGE DEVICE

BACKGROUND

Technical Field

The present disclosure relates to multi-view (MV) display panels that can display different content to each of multiple viewers at the same time, and more particularly to MV network bridge devices that provide MV display information to one or more MV display panels.

Description of the Related Art

MV display panels include an array of MV picture elements or pixels. MV display panels can be tiled together to create larger, higher resolution MV displays. To reduce cabling complexity, multiple MV display panels can be connected in series in a daisy chain. In such an architecture, data for all of the MV display panels in the chain can be sent from a computer to an interface on the first MV display panel in the chain, and the first MV display panel can forward data or a subset of the data to subsequent panels in the chain. An increase in the number of MV display panels in a daisy chain would require a proportional increase in the bandwidth of the interfaces between the MV display panels. With a large number of MV display panels, alternative architectures might be advantageous to reduce the bandwidth requirements of MV display panel interfaces and to lower system costs.

BRIEF SUMMARY

The present disclosure teaches MV display architectures that can reduce the bandwidth requirements of MV display panel interfaces. Thus, MV display architectures according to the present disclosure can lower system costs compared to conventional MV display architectures. More particularly, the present disclosure teaches a multi-view (MV) network bridge device that can serve as a communication intermediary between a computer and one or more MV display panels. The MV network bridge device may comprise an upstream interface and a plurality of downstream interfaces. In one or more embodiments, a computer generates a specification of viewing zones and a specification of content streams, and the computer sends the specifications of viewing zones and content streams to the MV network bridge device via the upstream interface. One or more MV display panels are connected to one or more of the plurality of downstream interfaces. The MV network bridge device comprises a controller that parses the specifications of viewing zones and content streams and sends at least a subset of the viewing zones and content streams to the MV display panels via the one or more downstream interfaces.

A multi-view (MV) network bridge device according to the present disclosure may be summarized as including an upstream interface, a plurality of downstream interfaces, and a controller. The controller, in operation, receives, from the upstream interface: a specification of one or more viewing zones, and a specification of one or more content streams. Also, the controller sends, on at least one of the plurality of downstream interfaces, at least a subset of each of the following received from the upstream interface: the specification of one or more viewing zones, and the specification of one or more content streams.

Each of the plurality of downstream interfaces may have a lower theoretical bandwidth than the upstream interface.

The specification of one or more viewing zones may be sent to each of the plurality of downstream interfaces.

The upstream interface may comprise one of: a High-Definition Multimedia Interface (HDMI) interface, a DisplayPort interface, an Ethernet interface, or a Universal Serial Bus (USB) interface.

The plurality of downstream interfaces may comprise Ethernet interfaces.

The upstream interface may comprise a plurality of physical interfaces. One of the plurality of physical interfaces may have a lower theoretical bandwidth than a different one of the plurality of physical interfaces.

The controller further, in operation, may receive, from the upstream interface: a specification of a configuration, and may send, on at least one of the plurality of downstream interfaces, the specification of the configuration. The specification of the configuration may comprise one or more of: a calibration parameter, a color palette, a display operation mode, a memory address, a register value, a display panel identification, a pixel mapping, a display panel rotation, and a display panel configuration. The upstream interface may comprise a plurality of physical interfaces, the specification of one or more viewing zones and the specification of one or more content streams may be received on a first one of the plurality of physical interfaces, and the specification of the configuration may be received on a second one of the plurality of physical interfaces.

The upstream interface may comprise an Ethernet interface, the plurality of downstream interfaces may comprise Ethernet interfaces, and the Ethernet interface of the upstream interface and the Ethernet interfaces of the plurality of downstream interfaces may be controlled by a single multi-port Ethernet physical layer transceiver.

The controller further, in operation, may receive display panel configuration information from one of the plurality of downstream interfaces. The controller further, in operation, for at least one of the one or more content streams in the specification of one or more content streams, may select a portion of the content stream, based on the display panel configuration information, and may send the portion of the content stream on the one of the plurality of downstream interfaces. The controller further, in operation, may store the received display panel configuration information in a register or memory. The controller further, in operation, may send the display panel configuration information on the upstream interface.

A multi-view (MV) system according to the present disclosure may be summarized as including an MV network bridge device, a computer, and a first MV display panel. The MV network bridge device includes an upstream interface, a plurality of downstream interfaces, and a controller. The controller, in operation, receives, from the upstream interface, a specification of one or more viewing zones, and a specification of one or more content streams. Also, the controller sends, on at least one of the plurality of downstream interfaces, at least a subset of each of the following received from the upstream interface: the specification of one or more viewing zones, and the specification of one or more content streams. The computer is coupled to the upstream interface of the MV network bridge device. The first MV display panel is coupled to a first one of the plurality of downstream interfaces of the MV network bridge device.

The system may further comprise a second MV display panel coupled to a second one of the plurality of downstream interfaces of the MV network bridge device.

The system may further comprise a second MV display panel coupled to the first MV display panel in a daisy chain.

A multi-view (MV) system according to the present disclosure may be summarized as including a first MV network bridge device, a computer, and a second MV network bridge device. The first MV network bridge device includes a first upstream interface, a plurality of first downstream interfaces, and a first controller. The first controller, in operation, receives, from the first upstream interface: a specification of one or more viewing zones, and a specification of one or more content streams. Also, the first controller sends, on at least one of the plurality of first downstream interfaces, at least a subset of each of the following received from the upstream interface: the specification of one or more viewing zones, and the specification of one or more content streams. The computer is coupled to the first upstream interface of the first MV network bridge device. The second MV network bridge device includes a second upstream interface, a plurality of second downstream interfaces, and a second controller. The second controller, in operation, receives, from the second upstream interface: the specification of one or more viewing zones, and the specification of one or more content streams. Also, the second controller sends, on at least one of the plurality of second downstream interfaces, at least a subset of each of the following received from the upstream interface: the specification of one or more viewing zones, and the specification of one or more content streams. The second upstream interface of the second MV network bridge device is coupled to one of the plurality of first downstream interfaces of the first MV network bridge device.

A multi-view (MV) system according to the present disclosure may be summarized as including an MV network bridge device and an MV display panel. The MV network bridge device includes an upstream interface, a plurality of downstream interfaces, and a controller. The controller, in operation, receives, from the upstream interface: a specification of one or more viewing zones, and a specification of one or more content streams. Also, the controller sends, on at least one of the plurality of downstream interfaces, at least a subset of each of the following received from the upstream interface: the specification of one or more viewing zones, and the specification of one or more content streams. The MV display panel is coupled to the upstream interface of the MV network bridge device.

BRIEF DESCRIPTION OF THE SEVERAL VIEWS OF THE DRAWINGS

FIG. 5B shows examples of specifications of content streams respectively displayed in viewing zones shown in FIG. 5A, and FIG. 5C shows examples of specifications of the viewing zones shown in FIG. 5A, according to one or more embodiments of the present disclosure.

DETAILED DESCRIPTION

Figure 1:
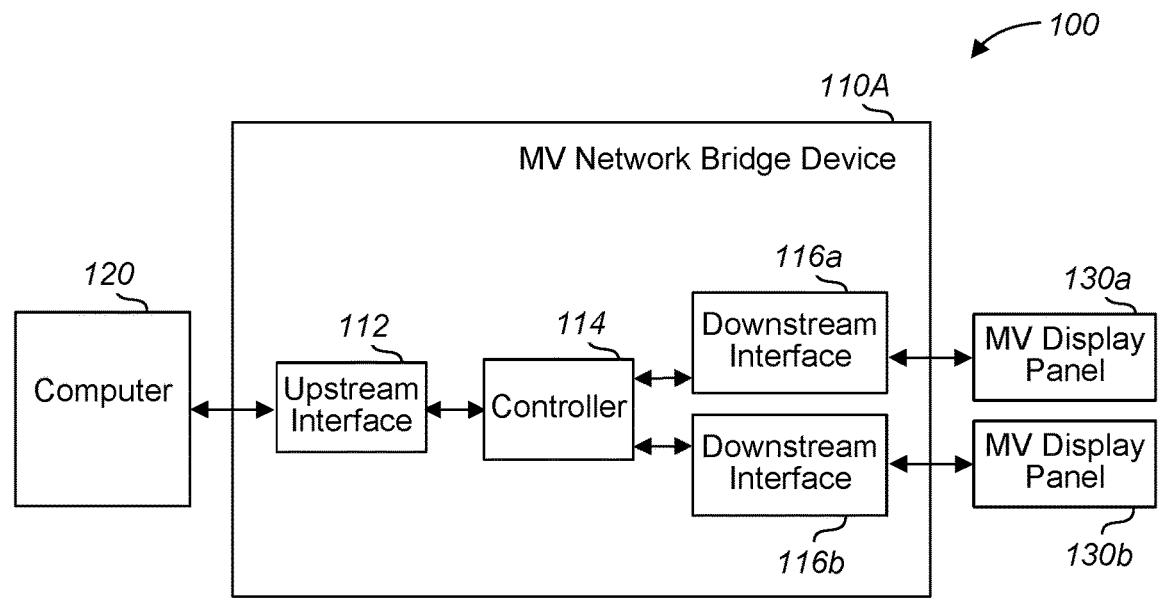
FIG. 1 shows an example of an MV display system including an MV network bridge device according to one or more embodiments of the present disclosure.

FIG. 1 shows an MV display system 100 including an MV network bridge device 110A according to one or more embodiments of the present disclosure. An upstream side of the MV network bridge device 110A receives MV display information (e.g., display panel configuration information, viewing zone information, or content streams), and a downstream side of the MV network bridge device 110A transmits MV display information. The upstream side of the MV network bridge device 110A may receive MV display information from another MV network bridge device, an MV display panel, or a computer that provides the MV display information. The downstream side of the MV network bridge device 110A may transmit portions of the MV display information to another MV network bridge device or an MV display device. In the example of FIG. 1, the upstream side of the MV network bridge device 110A is connected to a computer 120, and the downstream side of the MV network bridge device 110A is connected to a first MV display panel 130a and a second MV display panel 130b.

Figure 3:
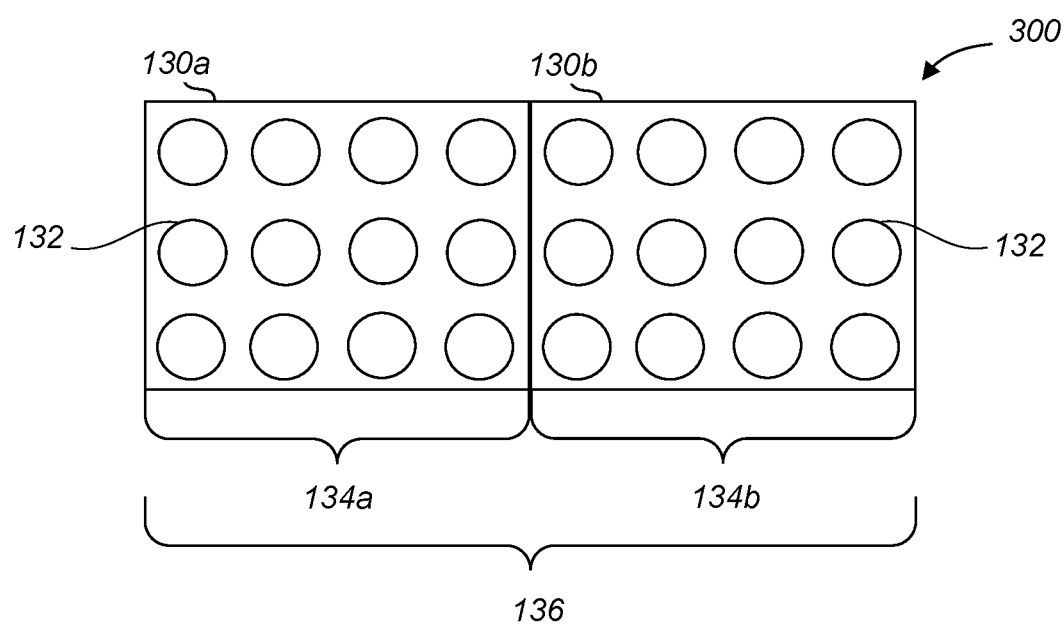
FIG. 3 shows yet another example of an MV display system according to one or more embodiments of the present disclosure.
Figure 5A:
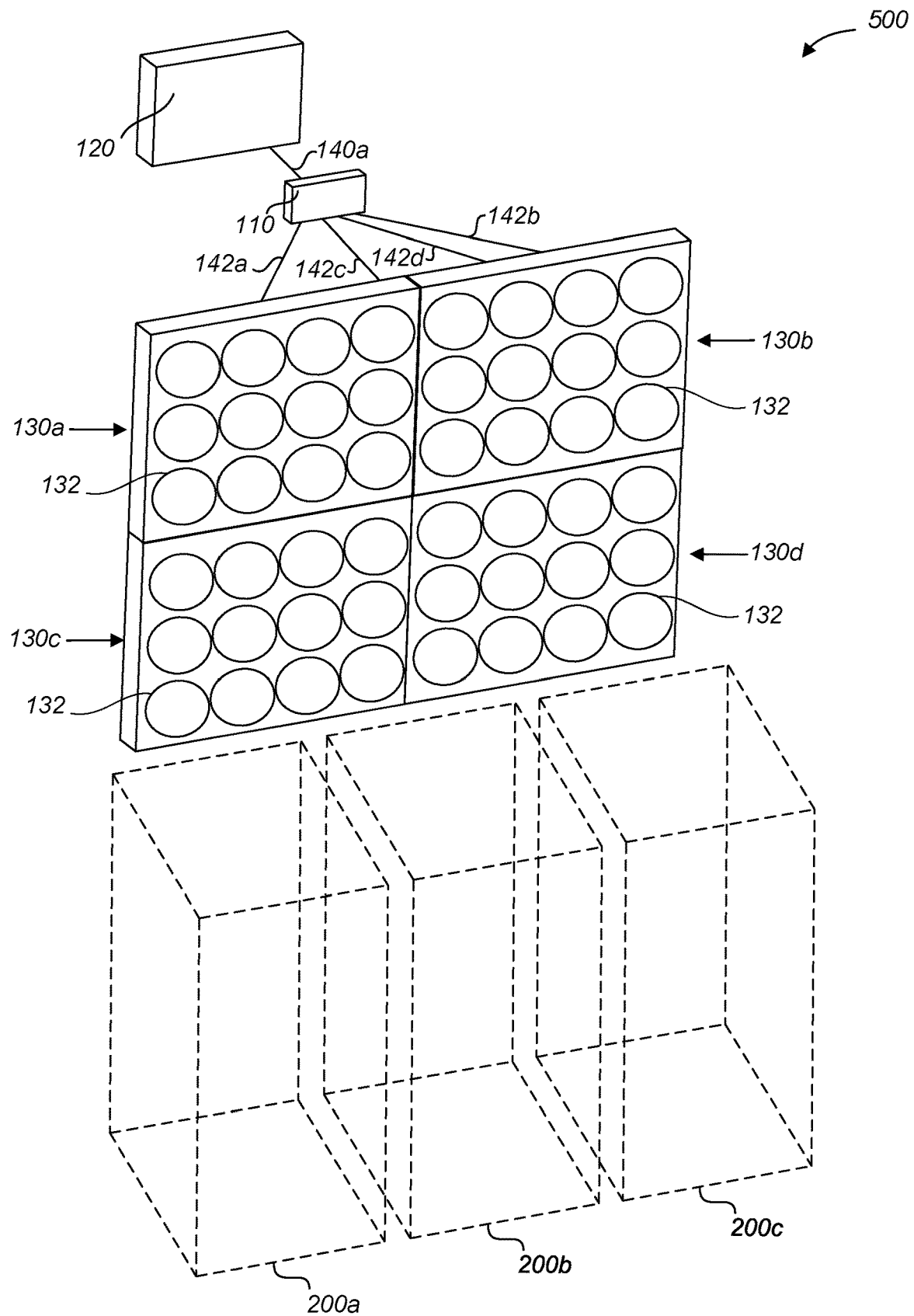
FIG. 5A shows still another example of a configuration of an MV display system.

Each of the first MV display panel 130a and the second MV display panel 130b includes an array of multi-view (MV) MV pixels 132 (see, e.g., FIGS. 3 and 5A). Each of the MV pixels 132 can emit different colored light in different directions. These individually controllable units of light, or beamlets, allow multiple viewers to simultaneously perceive different messages or content on the same shared display.

In one or more embodiments, each of the first MV display panel 130a and second MV display panel 130b is configured similarly to the precision MV display device 100 shown in FIG. 1 of U.S. Pat. No. 10,778,962 by Ng et al., which is incorporated by reference herein in its entirety. For example, the first MV display panel 130a and second MV display panel 130b each includes a display controller similar to the display controller shown in FIG. 19 of U.S. Pat. No. 10,778,962. The display controller controls the intensity of light emitted by each sub-picture element or sub-pixel of an FPD (flat panel display).

The upstream side of the MV network bridge device 110A may receive specifications of viewing zones and content streams, and the downstream side of the MV network bridge device 110A may provide the specifications of viewing zones and content streams to the first MV display panel 130a and the second MV display panel 130b. The first MV display panel 130a and the second MV display panel 130b may use the specifications of viewing zones and content streams to control the beamlets of the MV pixels in order to send the specified content streams to their corresponding viewing zones. Because each MV pixel can control many different beamlets, the bandwidth requirements for the first MV display panel 130a and the second MV display panel 130b can be significantly greater than those of a conventional display.

In view of the bandwidth requirements for the first MV display panel 130a and the second MV display panel 130b, the MV network bridge device 110A includes an upstream interface 112, a controller 114, a first downstream interface 116a, and a second downstream interface 116b. The upstream interface 112 is connected (e.g., by a first cable) to the computer 120. The first downstream interface 116a is connected (e.g., by a second cable) to the first MV display panel 130a, and the second downstream interface 116b is connected (e.g., by a third cable) to the second MV display panel 130b.

The controller 114 may include one or more processors and one or more memories storing instructions that cause the MV network bridge device 110A to perform the functions of the MV network bridge device 110A described herein. For example, the one or more memories store instructions that, when executed by the one or more processors, cause the MV network bridge device 110A to route each piece of MV display information received from the relatively high-bandwidth upstream interface 112 to one of the downstream interfaces 116a and 116b, allowing for the downstream interfaces 116a and 116b to be lower bandwidth and, thus, lower cost than the upstream interface 112. In one or more embodiments, the controller 114 may be an Application Specific Integrated Circuit (ASIC) or a programmable logic device such as a Field Programmable Gate Array (FPGA) that is configured to perform the functions described herein, for example.

In addition to receiving specifications of viewing zones and content streams, as described above, in one or more embodiments, the MV network bridge device 100 receives specifications of "configurations" from the upstream interface 112. The controller 114 is configured to parse the configurations to determine actions to perform, including but not limited to controlling settings for the MV network bridge device 110A and sending the configurations to the downstream first MV display panel 130a and second MV display panel 130b via the appropriate downstream interface 116a and 116b. Examples of such configurations include but are not limited to: calibration parameters, color palettes, display operation modes, memory or register updates, display panel identification data, pixel mappings, display panel rotation configurations, and display panel configurations.

In the example of FIG. 1, the upstream interface 112 receives MV display information for a plurality of MV pixels. The controller 114 provides to the first MV display panel 130a a first portion of the MV display information corresponding to the MV pixels provided by the first MV display panel 130a. Also, the controller 114 provides to the second MV display panel 130b a second portion of the MV display information corresponding to the MV pixels provided by the second MV display panel 130b. Accordingly, the MV network bridge device 110A may provide approximately one-half of the display information to each of the MV display panels 130a and 130b. In a larger arrangement, for example, including ten MV display panels, the MV network bridge device 110A may include ten downstream interfaces, and the controller 114 may provide approximately one-tenth of the received MV display information to each of the MV displays via one of the downstream interfaces.

Accordingly, in one or more embodiments, the upstream interface 112 can support a higher theoretical bandwidth than each of the downstream interfaces 116a and 116b. For example, the upstream interface 112 may provide a 10 Gbps Ethernet connection, while each of the downstream interfaces 116a and 116b may provide a 1 Gbps Ethernet connection. Other examples of the high-bandwidth upstream interface 112 include but are not limited to a High-Definition Multimedia Interface (HDMI) interface, a DisplayPort interface, an Ethernet interface, and a Universal Serial Bus (USB) interface.

The first MV display panel 130a and the second MV display panel 130b can be tiled together in an array of MV display panels, to provide an MV display system having a greater display area than either one of the first MV display panel 130a and the second MV display panel 130b. The computer 120 may generate MV display information indicating values of flat panel display (FPD) sub-pixels of FPD devices included in the first MV display panel 130a and the second MV display panel 130b that are used to display content in multiple viewing zones, information indicating the extent of each of the multiple viewing zones, and information indicating the number and configuration details of the first MV display panel 130a and the second MV display panel 130b.

For example, display panel configuration information may indicate a number of columns of MV pixels and a number of rows of MV pixels included in each of the first MV display panel 130a and the second MV display panel 130b. Also, the display panel configuration information may indicate a relative position of each of the first MV display panel 130a and the second MV display panel 130b when they are tiled in a particular configuration. For example, the display panel configuration information may indicate that the first MV display panel 130a and the second MV display panel 130b are tiled together to form a larger composite display area, and that they are arranged in an array of MV display panels having two columns and one row, wherein the first MV display panel 130a is on a left side of the display area and the second MV display panel 130b is on a right side of the display area. Using such display panel configuration information, the computer 120 may generate first MV display information for the MV pixels of the first MV display panel 130a and second MV display information for the MV pixels of the second MV display panel 130b, and the MV network bridge device 110A may route the first and second MV display information to the first MV display panel 130a and the second MV display panel 130b, respectively. Alternatively, the computer 120 may provide composite MV display information for the MV pixels of both of the first MV display panel 130a and the second MV display panel 130b to the MV network bridge device 110A, and the MV network bridge device 110A may use the display panel configuration information to segment the received composite MV display information into first and second MV display information, and then route the resulting first and second MV display information to the first MV display panel 130a and the second MV display panel 130b, respectively.

Figure 2:
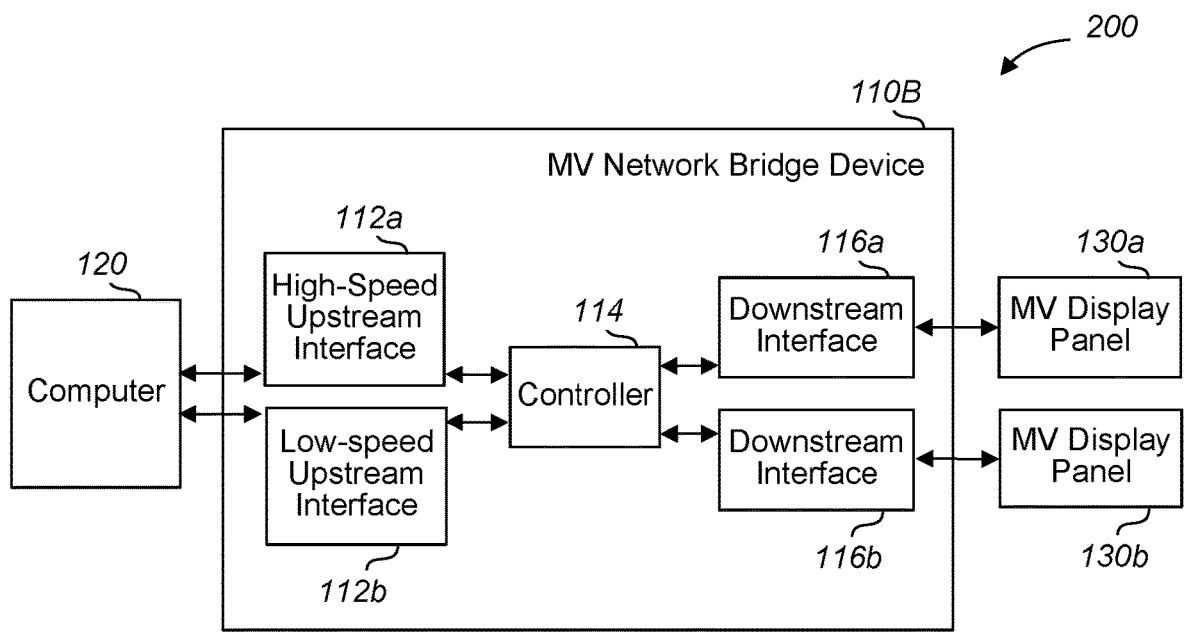
FIG. 2 shows another example of an MV display system including an MV network bridge device according to one or more embodiments of the present disclosure.

FIG. 2 shows an MV display system 200 including an MV network bridge device 110B according to one or more embodiments of the present disclosure. The MV network bridge device 110B is similar in many relevant respects to the network bridge device 110A shown in FIG. 1, except that the MV network bridge device 110B includes multiple physical upstream interfaces. More particularly, the MV network bridge device 110B includes a high-speed upstream interface 112a and a low-speed upstream interface 112b. This configuration enables different types of data, such as high-speed data and low-speed data, to be efficiently separated. For example, the high-speed upstream interface 112a is an HDMI interface and the low-speed upstream interface 112b a Gigabit Ethernet interface. Viewing zone and content stream data may be received on every video frame via the high-speed upstream interface 112a, while configuration data may be received at a relatively lower frequency via the low-speed upstream interface 112b. The upstream interfaces 112a and 112b and the downstream interfaces 116a and 116b may be controlled by separate physical layer transceivers (PHYs). Alternatively, the downstream interfaces 116a and 116b and one or more of the upstream interfaces 112a and 112b may be controlled by the same physical layer transceiver (PHY).

The controller 114 of the MV network bridge device 110B may query the downstream interfaces 116a and 116b to determine the number, configuration, and/or orientation of the MV display panels 130a and 130b connected to the interfaces 116a and 116b interfaces. Such a panel discovery operation may be performed upon bootup of the MV network bridge device 100B, upon a command from the computer 120 received by the upstream interface 112a or 112b, or upon automatic detection of a change in downstream interface connections. During a panel discovery operation, display panel configuration information may be received by the downstream interfaces 116a and 116b from the MV display panels 130a and 130b connected to the respective interfaces 116a and 116b. In one or more embodiments, the display panel configuration information received by the downstream interfaces 116a and 116b may be sent via one of the upstream interfaces 112a and 112b to the computer 120. In one or more embodiments, the controller 114 of the MV network bridge device 100B stores the display panel configuration information in a register or memory.

FIG. 3 shows an MV display system 300 according to one or more embodiments of the present disclosure. Each of the MV display panels 130a and 130b includes a plurality of MV pixels 132 arranged in an array having four columns and three rows. The MV display panels 130a and 130b are tiled together in order to create a larger composite display area arranged in an array having eight columns and three rows of MV pixels 132. For illustrative simplicity, the example of FIG. 3 includes only two MV display panels each having only twelve MV pixels 132. The MV display system 300 may include a different number of MV display panels each having a different number of MV pixels tiled together to form a composite display area of a desired size.

In the MV display system 300, the first MV display panel 130a corresponds to a first region 134a of a content stream 136, and the second MV display panel 130b corresponds to a second region 134b of the content stream 136. In the example of FIG. 3, the MV display panels 130a and 130b are physically arranged side-by-side, and each includes an array of MV pixels 132 having three rows and four columns. The content stream 136 may comprise values corresponding to each MV pixel 132 provided by the MV display panels 130a and 130b. The MV pixels 132 of the first MV display panel 130a may be mapped to the first region 134a of the content stream 136, and the MV pixels 132 of the second MV display panel 130b may be mapped to the second region 134b of the content stream 136. The pixel mapping information for each of the MV display panels 130a and 130b may be configured during runtime or stored in the respective MV display panels 130a and 130b. In one or more embodiments, the display panel configuration information received on a downstream interface of an MV network bridge device may comprise the pixel mapping(s) of the MV display panel(s) connected on the downstream interface.

FIGS. 4A-4D show examples of configurations of MV display systems according to various embodiments of the present disclosure. As shown in FIGS. 4A-4D, the upstream side of the MV network bridge device may be connected to another MV network bridge device, an MV display panel, or a computer that provides MV display information. Also, the downstream side of an MV network bridge device may be coupled to another MV network bridge device and/or one or more MV display devices.

Figure 4A:
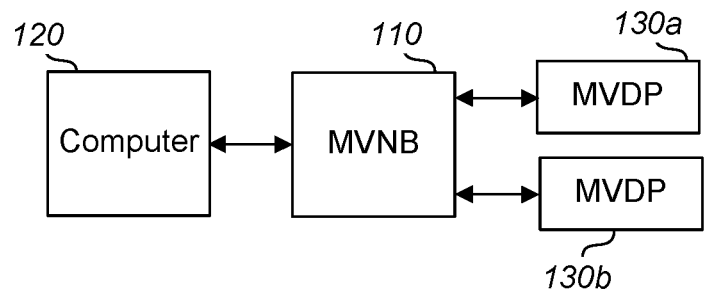
FIGS. 4A-4D show examples of configurations of MV display systems according to various embodiments of the present disclosure.

In the example of FIG. 4A, an upstream interface (not shown in FIG. 4A) of an MV network bridge device 110 (e.g., MV network bridge device 110A or MV network bridge device 110B) is connected to the computer 120, and respective downstream interfaces (not shown in FIG. 4A) of the MV network bridge device 110 are connected to the first MV display panel 130a the second MV display panel 130b. As with the examples of FIGS. 1 and 2, a controller (not shown in FIG. 4A) of the network bridge device 110 routes MV display information corresponding to MV pixels of the first MV display panel 130a to a first downstream interface (not shown in FIG. 4A) and routes MV display information corresponding to MV pixels of the second MV display panel 130b to a second downstream interface (not shown in FIG. 4A).

Figure 4B:
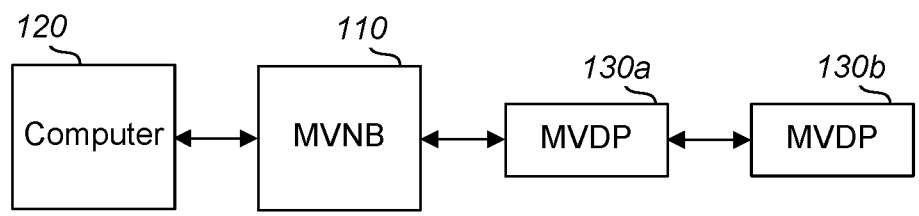

In the example of FIG. 4B, an upstream interface (not shown in FIG. 4B) of an MV network bridge device 110 (e.g., MV network bridge device 110A or 110B) is connected to the computer 120, and a downstream interface (not shown in FIG. 4B) of the MV network bridge device 110 is connected to the first MV display panel 130a, which is connected to the second MV display panel 130b. A controller (not shown in FIG. 4B) of the network bridge device 110 routes MV display information corresponding to MV pixels of the first MV display panel 130a and the second MV display panel 130b to the downstream interface (not shown in FIG. 4B) that is connected to the first MV display panel 130a.

Figure 4C:
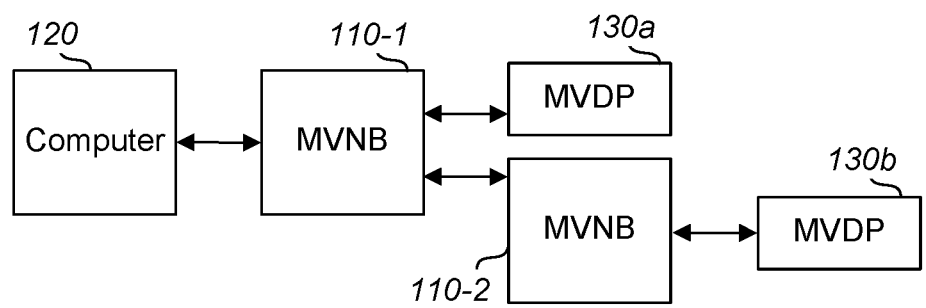

In the example of FIG. 4C, an upstream interface (not shown in FIG. 4C) of a first MV network bridge device 110-1 (e.g., MV network bridge device 110A or 110B) is connected to the computer 120. A first downstream interface (not shown in FIG. 4C) of the first MV network bridge device 110-1 is connected to the first MV display panel 130a. A second downstream interface (not shown in FIG. 4C) of the first MV network bridge device 110-1 is connected to an upstream interface (not shown in FIG. 4C) of a second MV network bridge device 110-2 (e.g., MV network bridge device 110A or 110B). A downstream interface (not shown in FIG. 4C) of the second MV network bridge device 110-2 is connected to the second MV display panel 130b. A controller (not shown in FIG. 4C) of the first network bridge device 110-1 routes MV display information corresponding to MV pixels of the first MV display panel 130a to the first downstream interface that is connected to the first MV display panel 130a, and routes MV display information corresponding to MV pixels of the second MV display panel 130b to the second downstream interface that is connected to the second MV network bridge device 110-2. A controller (not shown in FIG. 4C) of the second network bridge device 110-2 routes the MV display information corresponding to the MV pixels of the second MV display panel 130b to the downstream interface that is connected to the first MV display panel 130b.

Figure 4D:
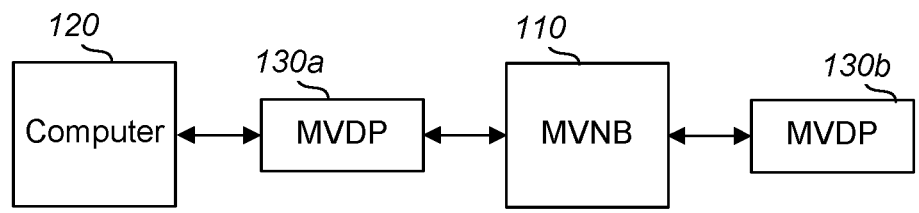

In the example of FIG. 4D, the computer 120 is connected to the first MV display panel 130a, which is connected to an upstream interface (not shown in FIG. 4D) of an MV network bridge device 110 (e.g., MV network bridge device 110A or 110B) having a downstream interface (not shown in FIG. 4D) that is connected to the second MV display panel 130b. A controller (not shown in FIG. 4D) of the network bridge device 110 routes MV display information corresponding to the MV pixels of the second MV display panel 130b to the downstream interface that is connected to the second MV display panel 130b.

FIG. 5A shows an example of a configuration of an MV display system 500 according to one or more embodiments of the present disclosure. The MV display system 500 includes an MV network bridge device (e.g., MV network bridge device 110A or 110B), a computer 120, and four MV display panels 130a-130d tiled together in an array having two columns and two rows of MV display panels. An upstream interface (not shown in FIG. 5A) of the MV network bridge device 110 is coupled to the computer 120 by a cable 140a. A first downstream interface (not shown in FIG. 5A) of the MV network bridge device 110 is coupled to a first MV display panel 130a by a cable 142a. A second downstream interface (not shown in FIG. 5A) of the MV network bridge device 110 is coupled to a second MV display panel 130b by a cable 142b. A third downstream interface (not shown in FIG. 5A) of the MV network bridge device 110 is coupled to a third MV display panel 130c by a cable 142c. A fourth downstream interface (not shown in FIG. 5A) of the MV network bridge device 110 is coupled to a fourth MV display panel 130d by a cable 142d.

The MV display panels 130a-130d may display different information or content streams in respective viewing zones 200a-200c. Accordingly, a viewer located in a first viewing zone 200a may observe one or more images corresponding to a first content stream, a viewer located in a second viewing zone 200b may observe one or more images corresponding to a second content stream, and a viewer located in the third viewing zone 200c may observe one or more images corresponding to a third content stream. In one example, the content streams correspond to the same information in different languages, wherein a viewer located in the first viewing zone 200a observes the information in a first language, a viewer located in the second viewing zone 200b observes the information in a second language, and a viewer located in the third viewing zone 200c observes the information in a third language.

In the example of FIG. 5A, for illustrative simplicity, each of the MV display panels 130a-130d includes an array of MV pixels 132 having four columns and three rows. Accordingly, when the MV display panels 130a-130d are tiled as shown in FIG. 5A, the resulting composite display area includes an array having eight columns and six rows of MV pixels 132. Each of the MV display panels 130a-130d includes a flat panel display (FPD) (not shown in FIG. 5A) having an array of FPD pixels, wherein each of the FPD pixels includes a red sub-pixel, a green sub-pixel, and a blue sub-pixel. Each of the MV pixels 132 corresponds to a plurality of FPD pixels of an FPD included in one of the MV display panels 130a-130d. The MV display panels 130a-130d may use stored calibration parameters and values of the MV pixels 132 included in content streams to compute specific values of FPD pixels (e.g., red sub-pixel values, green sub-pixel values, and a blue sub-pixel values). While the FPD pixels corresponding to an MV pixel 132 are illuminated, the MV pixel 132 may generate different beamlets in different directions, wherein each of the directions corresponds to one of the viewing zones 200a-200c. Each of the viewing zones 200a-200c may correspond to a collection of beamlets for each MV pixel 132. The collections of beamlets associated with different viewing zones may be mutually exclusive.

FIG. 5B shows examples of specifications 202a-202c of content streams respectively displayed in the viewing zones 200a-200c according to one or more embodiments of the present disclosure. A specification 202a of a first content stream includes a content stream identifier (e.g., "CS1") that uniquely identifies the first content stream that is displayed in the first viewing zone 200a, and a plurality of values of MV pixels MVP(1,1) to MVP(8, 6) corresponding to a frame of the first content stream 202a.

A specification 202b of a second content stream includes a content stream identifier that uniquely identifies the second content stream that is displayed in the second viewing zone, and a plurality of values of MV pixels MVP(1,1) to MVP(8, 6) corresponding to a frame of the second content stream. A specification 202c of a third content stream includes a content stream identifier that uniquely identifies the third content stream that is displayed in the third viewing zone 200c, and a plurality of values of MV pixels MVP(1,1) to MVP(8, 6) corresponding to a frame of the third content stream.

FIG. 5C shows examples of specifications 204a-204c of the viewing zones 200a-200c shown in FIG. 5A according to one or more embodiments of the present disclosure. In the examples of FIGS. 5A and 5C, each of the viewing zones 200a-200c has the shape of a rectangular prism that includes six rectangular faces, twelves edges, and eight vertices, wherein the angle between adjacent faces is ninety degrees. Each of the specifications 204a-204c may include a unique identifier of a viewing zone (e.g., "VZ1") and eight sets of three-dimensional coordinates respectively corresponding to the eight vertices of one of the viewing zones 200a-200c.

The viewing zones 200a-200c may have a variety of shapes in addition to rectangular prisms. In one or more embodiments, each of the viewing zones 200a-200c is a quadrilateral in three-dimensional space, and each of the specifications 204a-204c of the viewing zones 200a-200c includes four sets of three-dimensional coordinates corresponding to the vertices of a quadrilateral.

Referring once again to FIG. 5A, the computer 120 provides the specifications 204a-204c of the viewing zones 200a-200c to the upstream interface of the MV network bridge device 110. For illustrative purposes, assume that the MV display panels 130a and 130c are used to display content in the viewing zones 200a and 200b, but not in the viewing zone 200c. Thus, there may be no need for the MV network bridge device 110 to provide the specification 204c of the viewing zone 200c to the MV display panels 130a and 130c. Accordingly, the MV network bridge device 110 may provide a subset of the specifications 204a-204c of the viewing zones 200a-200c (e.g., specifications 204a-204b of the viewing zones 200a-200b) to the downstream interfaces that are coupled to the MV display panels 130a and 130c. Similarly, assume that the MV display panels 130b and 130d are used to display content in the viewing zones 200b and 200c, but not in the viewing zone 200a. Thus, there may be no need for the MV network bridge device 110 to provide the specification 204a of the viewing zone 200a to the MV display panels 130b and 130d. Accordingly, the MV network bridge device 110 may provide a subset of the specifications 204a-204c of the viewing zones 200a-200c (e.g., specifications 204b-204c of the viewing zones 200b-200c) to the downstream interfaces that are coupled to the MV display panels 130b and 130d.

By way of another example, the MV display panels 130a-130d may display content streams in each of the viewing zones 200a-200c. Accordingly, the MV network bridge device 110 may provide each of the specifications 204a-204c of the viewing zones 200a-200c to each the downstream interfaces that are coupled to the MV display panels 130a-130d.

The computer 120 may provide display panel configuration information to the MV network bridge device 110 indicating a mapping between MV pixels 132 and the MV display panels 130a-130d. The composite display area formed by tiling the display panels 130a-130d as shown in FIG. 5A includes an array having eight columns and six rows of MV pixels 132. In the following examples, a position within an array is given by (C, R), wherein C indicates a particular column and R indicates a particular row. Assuming that the first column is at the left side of the composite display area, and the first row is at the top of the composite display area, the display panel configuration information may indicate that MV pixels MVP(1, 1), MVP(2, 1), MVP(3, 1), MVP(4, 1), MVP(1, 2), MVP(2, 2), MVP(3, 2), MVP(4, 2), MVP(1, 3), MVP(2, 3), MVP(3, 3), and MVP(4, 3) correspond to the MV display panel 130a. Additionally, the display panel configuration information may indicate that MV pixels MVP(5, 1), MVP(6, 1), MVP(7, 1), MVP(8, 1), MVP(5, 2), MVP(6, 2), MVP(7, 2), MVP(8, 2), MVP(5, 3), MVP(6, 3), MVP(7, 3), and MVP(8, 3) correspond to the MV display panel 130b. In addition, the display panel configuration information may indicate that MV pixels MVP(1, 4), MVP(2, 4), MVP(3, 4), MVP(4, 4), MVP(1, 5), MVP(2, 5), MVP(3, 5), MVP(4, 5), MVP(1, 6), MVP(2, 6), MVP(3, 6), and MVP(4, 6) correspond to the MV display panel 130c. Also, the display panel configuration information may indicate that MV pixels MVP(5, 4), MVP(6, 4), MVP(7, 4), MVP(8, 4), MVP(5, 5), MVP(6, 5), MVP(7, 5), MVP(8, 5), MVP(5, 6), MVP(6, 6), MVP(7, 6), and MVP(8, 6) correspond to the MV display panel 130d. The display panel configuration information may use offset values, rather than a list of MV pixel coordinates, which can save data bandwidth.

In addition, the display panel configuration information may include data indicating a mapping between a three-dimensional viewing area (e.g., in a viewing zone coordinate system) and a two-dimensional coordinate system of FPD pixels (e.g., in a beamlet coordinate system) of each of the MV display panels 130a-130d. The mapping data enables each of the MV display panels 130a-130d to compute FPD pixels (e.g., beamlets) that map to each viewing zone, for example, as described in connection with FIGS. 8A, 8B, and 8C of U.S. Pat. No. 10,269,279 by Ng et al., which is incorporated by reference herein in its entirety. The processor of the MV network bridge device 110 may use the display panel configuration information to segment the information in each of the specifications of the content streams 202a-202c received via the upstream interface of the MV network bridge device 110. The MV network bridge device 110 may then provide a relevant subset of each of the specifications of the content streams 202a-202c to each of the MV display panels 130a-130d.

For example, the processor of the MV network bridge device 110 provides a subset of a specification of a content stream to the downstream interface that is coupled to the MV display panel 130a, wherein the subset includes values of the MV pixels MVP(1, 1), MVP(2, 1), MVP(3, 1), MVP(4, 1), MVP(1, 2), MVP(2, 2), MVP(3, 2), MVP(4, 2), MVP(1, 3), MVP(2, 3), MVP(3, 3), and MVP(4, 3). The processor of the MV network bridge device 110 may not provide that same subset of the specification of the content stream to the downstream interfaces that are coupled to the other MV display panels 130b-130d.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A multi-view (MV) system comprising:
a first MV network bridge device including:
   a first upstream interface;
   a plurality of first downstream interfaces different from the first upstream interface, wherein each of the plurality of first downstream interfaces has a lower theoretical bandwidth than the first upstream interface; and
   a first controller which, in operation:
      receives, from the first upstream interface:
         a specification of one or more viewing zones; and
         a specification of one or more content streams; and
      sends, on at least one of the plurality of first downstream interfaces, at least a subset of each of the following received from the upstream interface:
         the specification of one or more viewing zones; and
         the specification of one or more content streams;
a computer coupled to the first upstream interface of the first MV network bridge device; and
a second MV network bridge device including:
   a second upstream interface;
   a plurality of second downstream interfaces different from the second upstream interface, wherein each of the plurality of second downstream interfaces has a lower theoretical bandwidth than the second upstream interface; and
   a second controller which, in operation:
      receives, from the second upstream interface:
         the specification of one or more viewing zones; and
         the specification of one or more content streams; and
      sends, on at least one of the plurality of second downstream interfaces, at least a subset of each of the following received from the upstream interface:
         the specification of one or more viewing zones; and
         the specification of one or more content streams;
wherein the second upstream interface of the second MV network bridge device is coupled to one of the plurality of first downstream interfaces of the first MV network bridge device.

2. A multi-view (MV) system comprising:
an MV network bridge device including:
   an upstream interface;
   a plurality of downstream interfaces different from the upstream interface, wherein each of the plurality of downstream interfaces has a lower theoretical bandwidth than the upstream interface; and
   a controller which, in operation:
      receives, from the upstream interface:
         a specification of one or more viewing zones; and
         a specification of one or more content streams; and
      sends, on at least one of the plurality of downstream interfaces, at least a subset of each of the following received from the upstream interface:
         the specification of one or more viewing zones; and
         the specification of one or more content streams;

a computer coupled to the upstream interface of the MV network bridge device; and a first MV display panel coupled to a first one of the plurality of downstream interfaces of the MV network bridge device.

3. The system of claim 2, wherein the system further comprises a second MV display panel coupled to a second one of the plurality of downstream interfaces of the MV network bridge device.

4. The system of claim 2, wherein the system further comprises a second MV display panel coupled to the first MV display panel in a daisy chain.

5. A multi-view (MV) system comprising:
an MV network bridge device including:
an upstream interface;
a plurality of downstream interfaces different from the upstream interface, wherein each of the plurality of downstream interfaces has a lower theoretical bandwidth than the upstream interface; and
a controller which, in operation:
receives, from the upstream interface:
a specification of one or more viewing zones; and
a specification of one or more content streams; and
sends, on at least one of the plurality of downstream interfaces, at least a subset of each of the following received from the upstream interface:
the specification of one or more viewing zones; and
the specification of one or more content streams; and
an MV display panel coupled to the upstream interface of the MV network bridge device.

6. A multi-view (MV) network bridge device comprising:
an upstream interface;
a plurality of downstream interfaces different from the upstream interface, wherein each of the plurality of downstream interfaces has a lower theoretical bandwidth than the upstream interface; and
a controller which, in operation:
receives, from the upstream interface:
a specification of one or more viewing zones; and
a specification of one or more content streams; and
sends, on at least one of the plurality of downstream interfaces, at least a subset of each of the following received from the upstream interface:
the specification of one or more viewing zones; and
the specification of one or more content streams.

7. The MV network bridge device of claim 6, wherein the specification of one or more viewing zones is sent to each of the plurality of downstream interfaces.

8. The MV network bridge device of claim 6, wherein the upstream interface comprises one of: a High-Definition Multimedia Interface (HDMI) interface, a DisplayPort interface, an Ethernet interface, or a Universal Serial Bus (USB) interface.

9. The MV network bridge device of claim 6, wherein the plurality of downstream interfaces comprise Ethernet interfaces.

10. The MV network bridge device of claim 6, wherein the upstream interface comprises a plurality of physical interfaces.

11. The MV network bridge device of claim 10, wherein one of the plurality of physical interfaces has a lower theoretical bandwidth than a different one of the plurality of physical interfaces.

12. The MV network bridge device of claim 6, wherein the controller further, in operation:
receives, from the upstream interface, a specification of a configuration; and
sends, on at least one of the plurality of downstream interfaces, the specification of the configuration.

13. The MV network bridge device of claim 12, wherein the specification of the configuration comprises one or more of: a calibration parameter, a color palette, a display operation mode, a memory address, a register value, a display panel identification, a pixel mapping, a display panel rotation, and a display panel configuration.

14. The MV network bridge device of claim 12, wherein:
the upstream interface comprises a plurality of physical interfaces;
the specification of one or more viewing zones and the specification of one or more content streams are received on a first one of the plurality of physical interfaces; and
the specification of the configuration is received on a second one of the plurality of physical interfaces.

15. The MV network bridge device of claim 6, wherein:
the upstream interface comprises an Ethernet interface;
the plurality of downstream interfaces comprise Ethernet interfaces; and
the Ethernet interface of the upstream interface and the Ethernet interfaces of the plurality of downstream interfaces are controlled by a single multi-port Ethernet physical layer transceiver.

16. The MV network bridge device of claim 6, wherein the controller further, in operation, receives display panel configuration information from one of the plurality of downstream interfaces.

17. The MV network bridge device of claim 16, wherein the controller further, in operation, for at least one of the one or more content streams in the specification of one or more content streams:
selects a portion of the content stream, based on the display panel configuration information; and
sends the portion of the content stream on the one of the plurality of downstream interfaces.

18. The MV network bridge device of claim 16, wherein the controller further, in operation, stores the received display panel configuration information in a register or memory.

19. The MV network bridge device of claim 16, wherein the controller further, in operation, sends the display panel configuration information on the upstream interface.

* * * * *